United States Patent [19]

Van den Heuvel

[11] Patent Number: 5,119,191

[45] Date of Patent: Jun. 2, 1992

[54] FLICKER PROCESSOR FOR CINEMA VIDEO ASSIST

[75] Inventor: Raymond C. Van den Heuvel, Northridge, Calif.

[73] Assignee: Panavision International, L.P., New York, N.Y.

[21] Appl. No.: 530,235

[22] Filed: May 30, 1990

[51] Int. Cl.[5] .............................................. H04N 3/36
[52] U.S. Cl. ..................................... 358/97; 358/214; 358/315
[58] Field of Search .................. 358/214, 97, 140, 215

[56] References Cited

U.S. PATENT DOCUMENTS

| | | |
|---|---|---|
| 3,490,835 | 1/1970 | Nemeth et al. . |
| 3,715,486 | 2/1973 | Wright et al. . |
| 4,171,529 | 10/1979 | Silberberg et al. . |
| 4,301,476 | 11/1981 | Keller et al. . |
| 4,346,408 | 8/1982 | Massmann ............................ 358/214 |
| 4,386,367 | 5/1983 | Peterson et al. ..................... 358/140 |
| 4,709,277 | 11/1987 | Ninomiya et al. .............. 358/140 X |
| 4,769,699 | 9/1988 | Gebauer et al. . |
| 4,903,131 | 2/1990 | Lingemann et al. ................. 358/214 |
| 4,928,171 | 5/1990 | Kline ....................................... 358/97 |
| 4,934,821 | 6/1990 | Morton ........................... 358/214 X |

FOREIGN PATENT DOCUMENTS

| | | |
|---|---|---|
| 0162311 | 11/1985 | European Pat. Off. . |
| 3437208 | 5/1986 | Fed. Rep. of Germany . |
| 3437210 | 5/1986 | Fed. Rep. of Germany . |
| 1139580 | 1/1969 | United Kingdom . |
| 1377928 | 12/1974 | United Kingdom . |
| 15628909 | 10/1978 | United Kingdom . |
| 15627660 | 5/1980 | United Kingdom . |
| 737275 | 9/1985 | United Kingdom . |

*Primary Examiner*—Victor R. Kostak
*Attorney, Agent, or Firm*—Lyon & Lyon

[57] ABSTRACT

In a video assist system, an intermittent composite video signal produced by a modified television camera from a motion-picture image is converted to a composite video output signal in a continuous television format, by writing a largely unprocessed intermittent signal (including composite color, intensity and timing information) into a field buffer and reading a continuous television output signal (including both control elements and data) from that field buffer. The field buffer may comprise multiplexed banks of static RAM, with separate read address and write address generators for reading and writing data independently. When a field is repeated on output, an even-lines field may follow a previous even-lines field or an odd-lines field may follow a previous odd-lines field. It is not necessary to synchronize the phase of the video assist system with the motion-picture camera, and it is possible to retrieve television image frames at a divisor of the motion-picture camera frame rate to work with a brighter image.

39 Claims, 4 Drawing Sheets

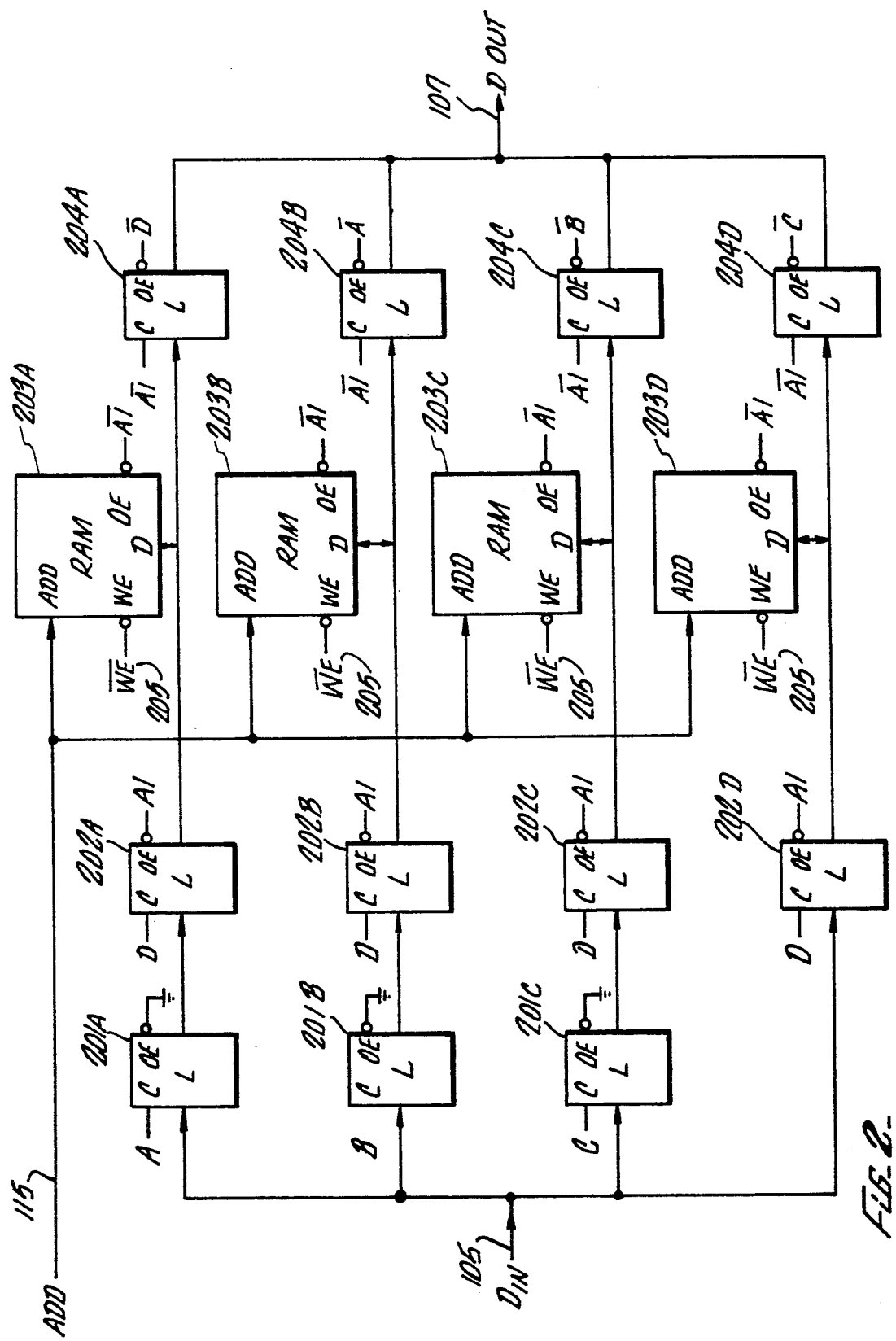

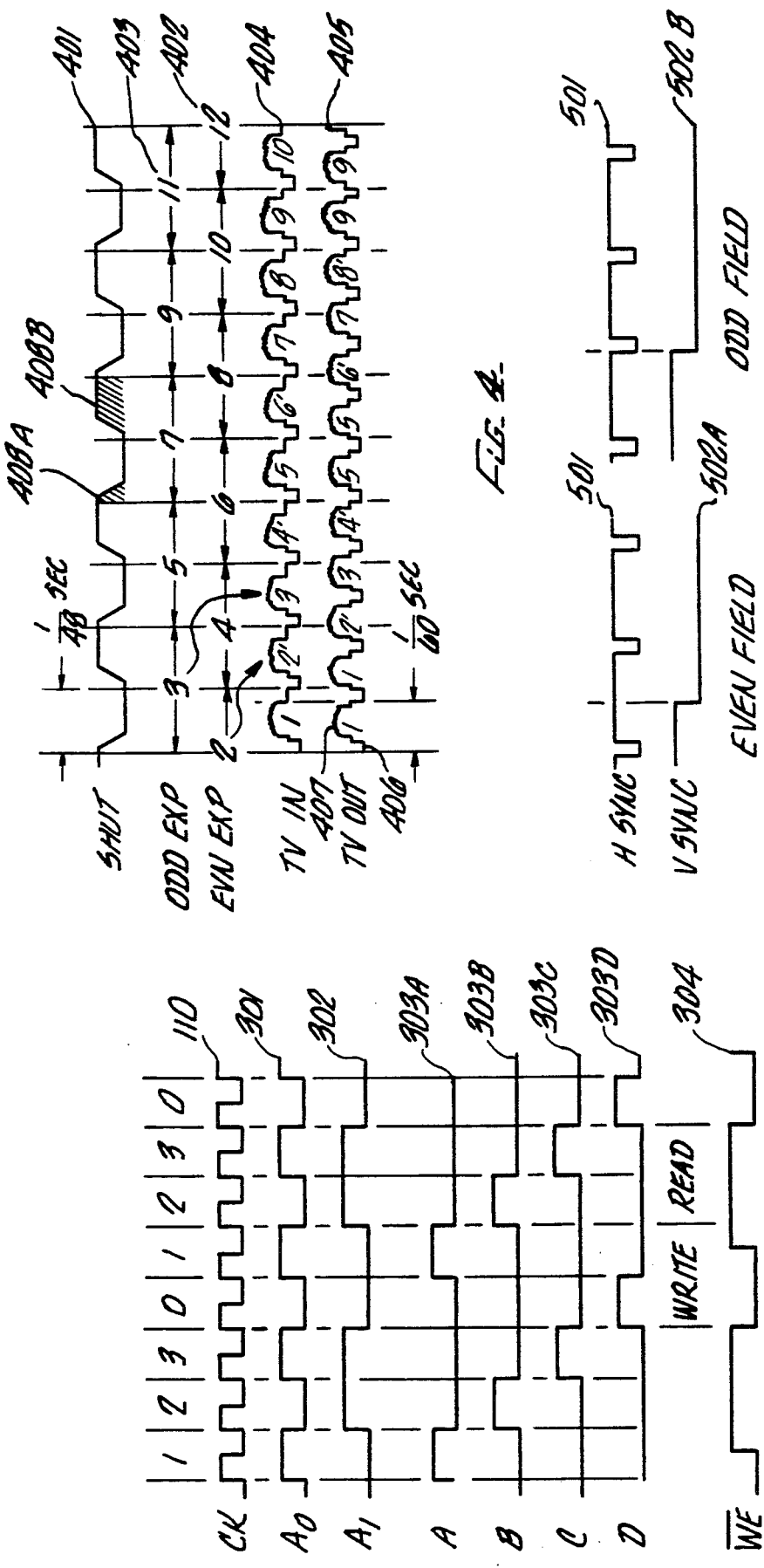

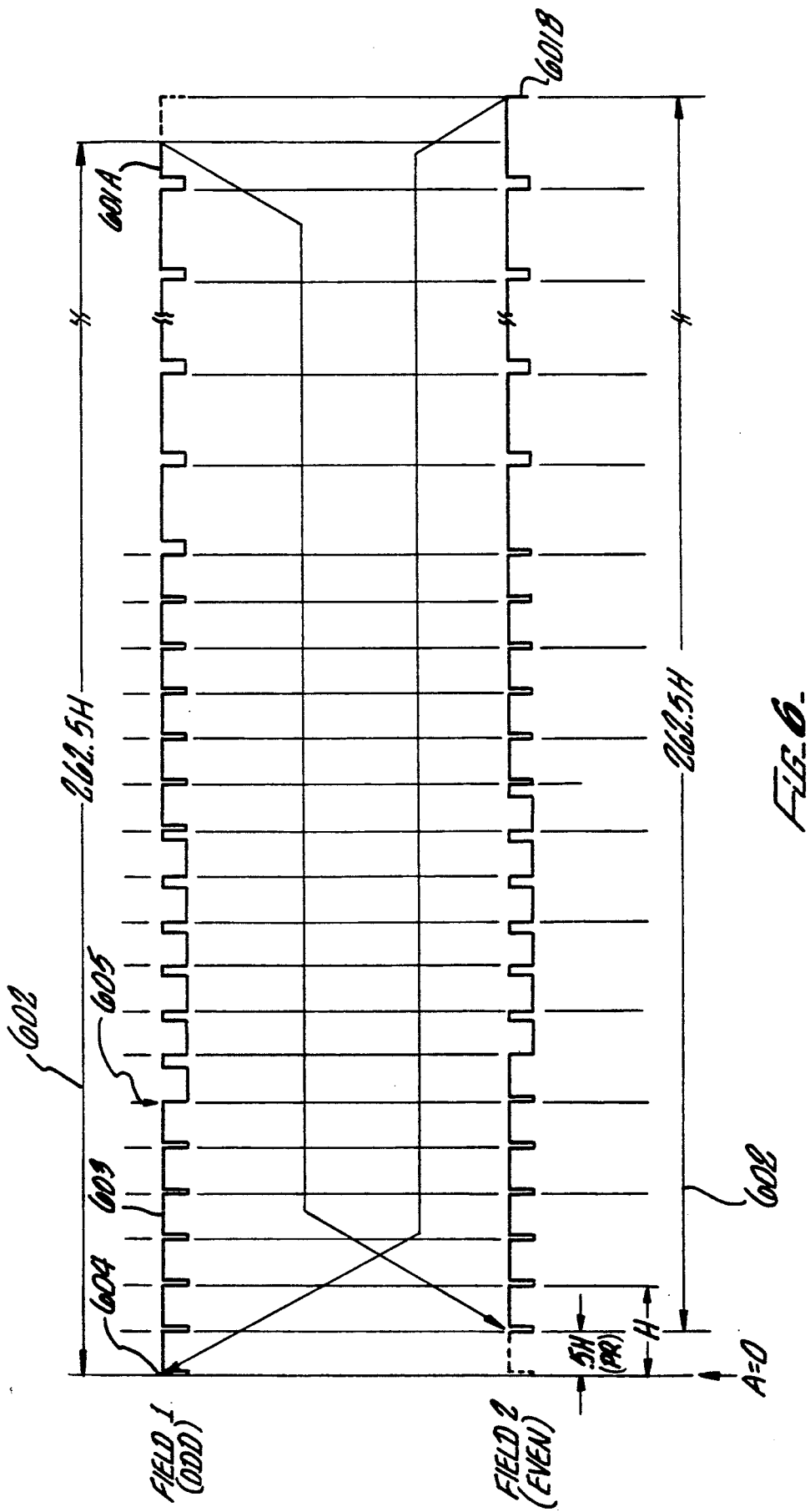

FLICKER PROCESSOR FOR CINEMA VIDEO ASSIST

BACKGROUND OF THE INVENTION

1. Field of the Invention

This invention relates to video assist systems for motion-picture cameras. More specifically, this invention relates to a television video assist system for converting motion-picture camera images to television signals suitable for broadcast, display or recording.

2. Description of Related Art

Some advantages which may be obtained from video assist systems for motion-picture cameras are disclosed in U.S. Pat. No. 4,928,171, "VIDEO ASSIST SYSTEM FOR MOTION-PICTURE CAMERA", hereby incorporated by reference as if fully set forth herein. As used herein, a "video assist system" is a system which duplicates the image available to the motion-picture camera operator (the "operator") for presentation at another location. Typically a television ("TV") camera will be used. One of the primary problems which is encountered in the art is flicker, which may be caused by mismatch between the frame capture rates of the motion-picture camera and the TV camera. As used herein, a "video flicker processor" is a system which operates to remove objectionable flicker.

One problem in the art is that optics which are used with video assist systems in motion-picture cameras typically require that light must be shared between the operator and the TV camera. Thus, a sensitive TV camera may be needed. This problem is particularly acute with color TV cameras, which may be as little as one-tenth as sensitive as black and white TV cameras.

Another problem in the art is that due to the arrangement of optics, the TV camera may record a mirror image of the actual scene. This may require either an additional mirror in the optical system, or may require additional processing by the video assist system.

Some well-known differences between motion-picture and TV cameras are as follows. A motion-picture camera typically captures 24 frames per second, but may have a frame capture rate which is set by the operator. Each frame thus comprises a shutter-open portion, typically lasting 1/48 of a second, and a shutter-closed portion, also typically lasting 1/48 of a second. In contrast, a TV camera typically captures 30 frames per second (in NTSC format, as is well known in the art), each comprising 525 horizontal lines. Each frame is displayed as two consecutive fields, each comprising 262.5 horizontal lines and lasting 1/60 of a second. Half of the fields comprise even-numbered lines of the frame ("even fields"), while half comprise odd-numbered lines ("odd fields"); even fields and odd fields are interlaced upon display.

One method is to use a TV camera in a video assist system which is synchronized with the motion-picture camera so that one field of the TV signal (lasting 1/60 second) is transmitted for each motion-picture frame (lasting 1/48 second). Generally, only one kind (i.e., even or odd) of field is transmitted by the TV camera. (During the shutter-closed portion, the TV signal is ignored.) When the one field of the TV signal is transmitted at a standard TV-format rate, there remains a substantial time interval for the shutter-open portion of each motion-picture frame during which no video signal is transmitted. The TV signal has less brightness because only one field is used.

One problem with this method is that the TV camera must be phase-synchronized with the motion-picture camera so that each frame which the TV camera captures comprises an equal amount of light, i.e., each frame has an equal proportion of time during which the motion-picture camera shutter is open. If the motion-picture and the TV camera are not synchronized, successive frames may vary in overall brightness and the image will flicker.

One method for converting the motion-picture image to a TV image is similar to methods used for converting between different TV-format standards, such as between NTSC and PAL. (Both of these TV formats are well-known in the art.) These methods for converting standards may use a video buffer (also called a "frame grabber") which will typically store over 1 megabit of memory with access times of under 100 nanoseconds ("nsec") per bit.

One problem with this method is that control and timing of a typical video buffer may be complex and therefore subject to error. For example, color and synchronization ("sync") signals must be removed from the video signal prior to storage in the video buffer, and must then be reinserted into the video signal when it is retrieved.

Another problem with this method is that mismatch between the frame capture rates or frame display rates of the motion-picture camera and the TV camera may cause jerkiness or other motion artifacts in the displayed image. For example, when the motion-picture camera captures 24 frames per second, and the TV camera captures 30 frames per second, some of the motion-picture images (or some parts of those images) must be repeated to generate a smooth TV signal.

A particular type of motion artifact may be generated when the TV signal comprises interlaced fields which are stored in a field buffer. When a field is repeated (or some part of a field is repeated) from the field buffer, it may be a field which is earlier in time than the previous field, causing a motion artifact which can be noticed by the viewer.

SUMMARY OF THE INVENTION

In the video assist system of the invention, a motion-picture image is input at a frame rate of a motion-picture camera. A television camera receives this image and produces an intermittent video signal in which even and odd fields are generated in synchrony with the frames of the motion-picture image, but in which the image data for each frame is processed at a television rate. The intermittent signal is converted to an output signal in a continuous television format, by writing a largely unprocessed intermittent signal (including both control elements and data) into a field buffer and reading a continuous television output signal (including both control elements and data) from that field buffer.

In a preferred embodiment, the field buffer may comprise multiple banks of static RAM, with an input port for demultiplexed writing into the buffer and an output port for multiplexed reading from the buffer. Separate read address and write address generators provide for reading and writing data independently. When the read address overtakes the write address, stored control signals and image data are repeated on output as they were written for the previous field, thus repeating image fields every so often to convert between the motion-picture frame rate and a television-format frame rate.

In a preferred embodiment, both even and odd fields are stored in the field buffer, but the field buffer stores only a single field (of control signals and data). When a field is repeated on output, an even-lines field may follow a previous even-lines field or an odd-lines field may follow a previous odd-lines field. It is not necessary to synchronize the phase of the video assist system with the motion-picture camera, and it is possible to retrieve television image frames at a divisor of the motion-picture camera frame rate to work with a brighter image.

BRIEF DESCRIPTION OF THE DRAWINGS

FIG. 2 shows a block diagram of the field buffer in an embodiment of the invention.

FIG. 3 shows a timing diagram of control signals for the field buffer in an embodiment of the invention.

FIG. 4 shows a timing diagram of the motion-picture camera and TV signals in an embodiment of the invention.

FIG. 5 shows a timing diagram of horizontal and vertical sync signals for even and odd fields in TV standard composite video.

FIG. 6 shows a diagram of how the input video signal is stored in the field buffer.

DESCRIPTION OF THE PREFERRED EMBODIMENT

Figure 1:
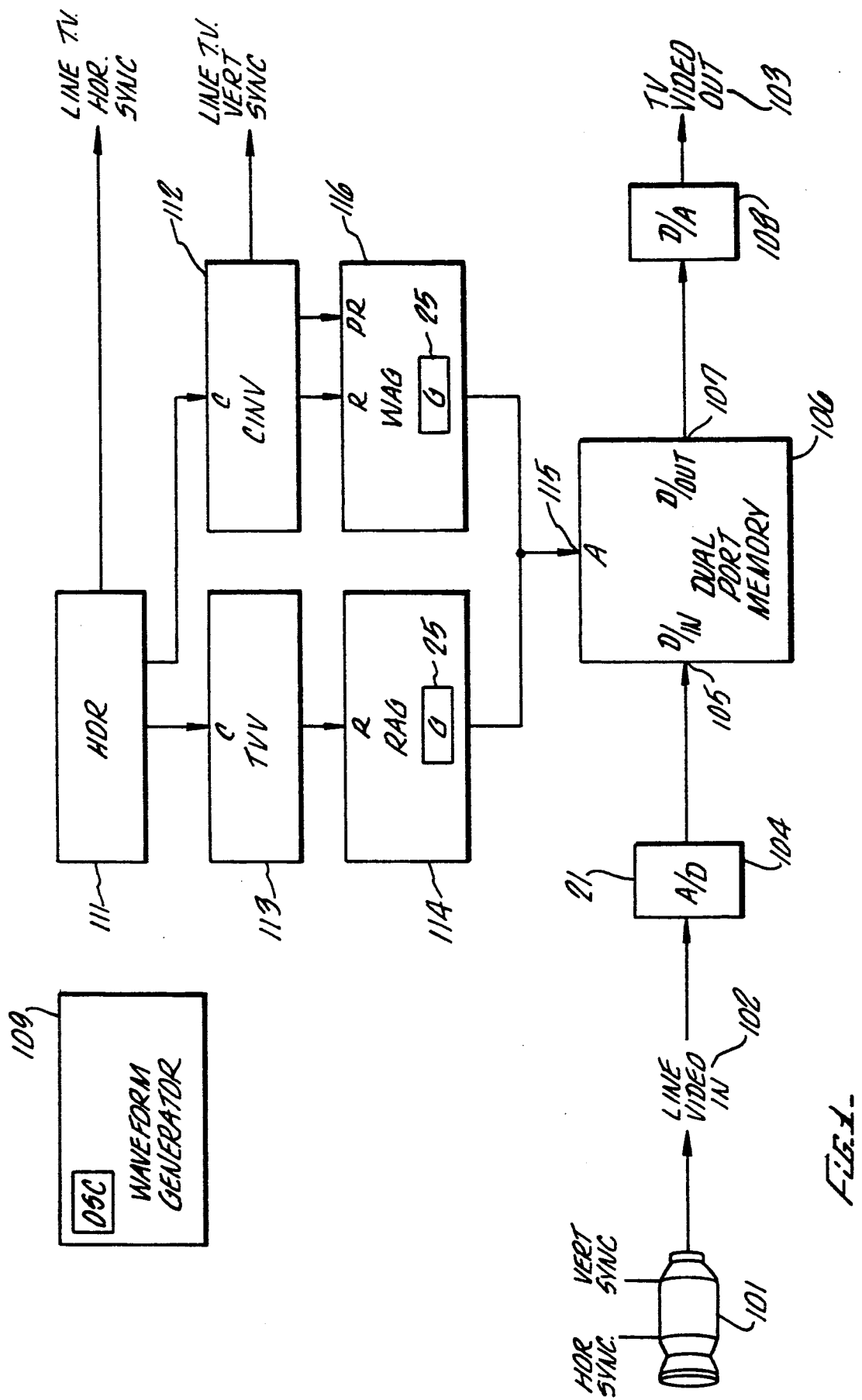
FIG. 1 shows a block diagram of primary functional elements of an embodiment of the invention.

FIG. 1 shows a block diagram of primary functional elements of an embodiment of the invention.

In a video assist system, a motion-picture camera (not shown) is combined with a TV camera 101 by means of an optical beam-splitting arrangement, as is well known in the art. The TV camera 101 produces an input video signal which is transmitted to a video input port 102. The input video signal is converted to an output video signal which is output by means of a video output port 103. The output video signal comprises a TV-format video signal such as the NTSC or PAL formats; these image formats are well known in the art.

The video input port 102 is coupled to an input of an analog-to-digital converter ("A/D") 104, which converts the input video signal to a stream of 8-bit digital outputs, as is well known in the art. An output of the A/D 104 is coupled to a data input 105 of a field buffer 106, which stores one field of the input video signal in a digital format (see FIG. 2). A data output 107 of the field buffer 106 is coupled to a digital-to-analog ("D/A") converter 108, which converts digital data to a continuous analog signal, as is well known in the art. An output of the D/A 108 is coupled to the video output port 103.

A waveform generator 109 generates a constant-frequency 14.31818 MHz oscillator signal 110, as is well known in the art. The waveform generator 109 may comprise a crystal oscillator, as is well known in the art. An output of the waveform generator 109 is coupled to an input of a horizontal time base 111. All of the signals shown in FIG. 3, and their complements, are generated by the waveform generator 109.

Signal Generators

The horizontal time base 111 receives the 14.31818 MHz oscillator signal 110, divides it by two and then divides it by 455 to generate a constant-frequency 15.734 KHz horizontal sync signal, as is well known in the art. An output of the horizontal time base 111 is coupled to a horizontal sync input for the TV camera 101, to a cinema vertical time base 112 and to a TV vertical time base 113, as is well known in the art.

The cinema vertical time base 112 receives the 15.734 KHz horizontal sync signal, multiplies it by two and then divides it by 655 to generate a constant-frequency 48.04 Hz cinema vertical sync signal, as is well known in the art. This cinema vertical sync signal is sufficiently close to synchronized with the frame capture rate of the motion-picture camera that it may be used to synchronize the TV camera 101 with the motion-picture camera. An output of the cinema vertical time base 112 is coupled to a vertical sync input for the TV camera 101.

The TV vertical time base 113 receives the 15.734 KHz horizontal sync signal, multiplies it by two and then divides it by 525 to generate a constant-frequency 59.94 Hz TV vertical sync signal, as is well known in the art. This TV vertical sync signal is NTSC format standard. As to the cinema vertical time base 112 and the TV vertical time base 113, it would be clear to one of ordinary skill in the art, after perusal of the specification, drawings and claims herein, that other and further frequency ratios would be compatible with corresponding other and further TV-format standards, and are within the scope and spirit of the invention.

A read address generator ("RAG") 114 is coupled to the TV vertical time base 113 and receives the TV vertical sync signal therefrom. The RAG 114 generates an read address which is coupled to an address input 115 of the field buffer 106. In a preferred embodiment, the RAG 114 may comprise a counter which is incremented once every four pixel times (see FIG. 2) and which is reset to zero by the TV vertical sync signal.

A write address generator ("WAG") 116 is coupled to the cinema vertical time base 112 and receives the cinema vertical sync signal therefrom. The WAG 116 generates a write address which is also coupled to the address input 115 of the field buffer 106. In a preferred embodiment, the WAG 116 may comprise a counter which is incremented once every four pixel times (see FIG. 2) and which is reset by the cinema vertical sync signal. In a preferred embodiment, the WAG 116 is reset to zero for odd fields, but for even fields is reset to an address corresponding to half of a horizontal line offset from zero (see FIG. 6).

Field Buffer Structure

FIG. 2 shows a block diagram of the field buffer 106 in an embodiment of the invention.

The data input 105 is coupled to a set of three primary latches 201 A, B and C, each of which is coupled to a corresponding secondary latch 202 A, B and C. The data input 105 is also coupled to the fourth secondary latch 202 D. Each of the four secondary latches 202 A, B, C and D is coupled to a data input/output port of a corresponding memory circuit 203 A, B, C and D, which is also coupled to a corresponding output latch 204 A, B, C and D. All four of the output latches 204 A, B, C and D are also coupled to the data output 107.

In a preferred embodiment, the memory circuits 203 A, B, C and D may comprise a set of four static CMOS RAM circuits such as part number HM628128 sold by Hitachi. (An equivalent circuit is sold by Mitsubishi, Sony and Toshiba, under a different part number.) The preferred circuit has an 8-bit data bus, a 17-bit address bus, 1 megabit storage capacity and about 100 nsec access time. The total storage capacity of the memory circuits 203 A, B, C and D is thus about 4 megabits, enough to record two full fields having a total of 525 lines, each line having 910 pixels, each pixel having 8 bits. Using four circuits in parallel allows effective access of about 50 nsec in a dual-ported multiplexed memory. When oscillator signal 110 is 14.31818 MHz, the actual pixel time is 69.84 (about 70) nsec.

It would be clear to one of ordinary skill in the art, after perusal of the specification, drawings and claims herein, that the memory circuits 203 A, B, C and D may comprise other and further amounts of storage capacity if it is desired to accommodate other and further TV-format standards (such as PAL) and to accommodate other and further peripheral TV functions.

An address input of each of the four memory circuits 203 A, B, C and D is coupled to the address input 115. A write-enable input of each of the four memory circuits 203 A, B, C and D is coupled to a common write-enable input 205.

Field Buffer I/O Timing

In a preferred embodiment, the field buffer 106 has a four pixel-time cycle. One 8-bit pixel is received at the data input 105 about every 70 nsec. Every four pixel-times (for the first two out of four pixels in a cycle) a 32-bit word of data is written into the memory circuits 203 A, B, C and D. Similarly, every four pixel-times (for the last two out of four pixels in a cycle) a 32-bit word of data is read out from the memory circuits 203 A, B, C and D. (In a preferred embodiment, data is written into the memory circuits 203 A, B, C and D before it is read out, so as to minimize motion artifacts when the read address and the write address are the same.) A clock signal for the first three pixel-times is input to the corresponding primary latch 201 A, B and C, and a clock signal for the fourth pixel-time is input to all the secondary latches 202 A, B, C and D.

In each cycle, the first pixel is stored in the first primary latch 201 A, the second pixel is stored in the second primary latch 201 B, and the third pixel is stored in the third primary latch 201 C. When the fourth pixel arrives, it is stored directly in the fourth secondary latch 202 D, and the first, second and third pixels are transmitted from the primary latches 201 A, B and C to the corresponding secondary latches 202 A, B and C.

At the end of the first cycle (i.e., after the fourth pixel arrives), four consecutive pixels have been stored in the secondary latches 202 A, B, C and D, collectively comprising a 32-bit input for the corresponding memory circuits 203 A, B, C and D. This 32-bit input is unchanged for four pixel-times, comprising the fourth pixel-time of the first cycle and the first three pixel-times of the second cycle (i.e., when the fifth, sixth and seventh pixels are stored in the primary latches 201 A, B and C).

In the second cycle, when the eighth pixel arrives and is stored in the secondary latch 202 D, the previous 32-bit input is replaced. The new 32-bit input then remains unchanged for the next four pixel-times, including the first three pixel-times of the third cycle (i.e, when the ninth, tenth and eleventh pixels are stored in the primary latches 201 A, B and C).

During the first two pixel-times of the period when the 32-bit input remains unchanged, the address input 115 is coupled to the WAG 116, so that data read from the data input 105 may be written into the memory circuits 203 A, B, C and D. Similarly, during the last two pixel-times of the period when the 32-bit input remains unchanged, the address input 115 is coupled to the RAG 114 so that data read out from the memory circuits 203 A, B, C and D may be written to the data output 107. Note that the write operation precedes the read operation so that when both the RAG 114 and the WAG 116 point to the same address, input and output TV signals are the same.

In each cycle, while the address input 115 is coupled to the RAG 114, data appearing at the outputs of the memory circuits 203 A, B, C and D becomes stable after a time, and collectively comprises a 32-bit output. The 32-bit output is stored in the output latches 204 A, B, C and D and remains unchanged for four pixel-times. This is sufficient time for a tristate control for each of the output latches 204 A, B, C and D to be activated one at a time in sequence, so as to output four consecutive pixels to the data output 107.

Field Buffer Control

FIG. 3 shows a timing diagram of control signals for the field buffer 106 in an embodiment of the invention.

The 14.31818 MHz oscillator signal 110 is divided by two to generate a half-clock signal 301 and divided by four to generate a quarter-clock signal 302, which in turn are used to generate a set of four pixel-time signals 303 A, B, C and D, each of which identifies one of the four pixel-times in a four pixeltime cycle (see disclosure with respect to FIG. 2). Inverted forms of each of the half-clock signal 304, the quarter-clock signal 305, and the four pixel-time signals 303 A, B, C and D are also generated.

In a four pixel-time cycle having pixel-times A, B, C and D, pixel-times D and A collectively comprise a writing time and pixel-times B and C collectively comprise a reading time. A write-enable signal 306 is generated and coupled to the write-enable input 205. In a preferred embodiment, the write-enable signal 306 may comprise a copy of the quarter-clock signal 302, 305 with its low-to-high transition occurring early, so as to terminate any write operation in the field buffer 106 before the write address changes.

The pixel-time signals 303 A, B and C are coupled to the primary latches 201 A, B and C; the pixel-time signal 303 D is coupled to the secondary latches 202 A, B, C and D (see FIG. 1). The primary latches 201 A, B and C therefore store incoming pixels at the rising edge of the pixel-time signals 303 A, B and C, and the secondary latches 202 A, B, C and D store incoming pixels at the rising edge of the pixel-time signal 303 D.

At that time, the quarter-clock signal 302, 305, coupled to an output-enable input (active-low tristate control) of each of the secondary latches 202 A, B, C and D, causes the pixels stored therein to be stored in the memory circuits 203 A, B, C and D, while the write-enable signal 306 (active-low), coupled to the write-enable input 205, is simultaneously activated.

The quarter-clock signal 302, 305, inverted, coupled to an output-enable input (active-low tristate control) of each of the memory circuits 203 A, B, C and D and to a clock input of each of the output latches 204 A, B, C and D, causes the pixels stored in the memory circuits 203 A, B, C and D to be stored in the output latches 204 A, B, C and D. The four pixel-time signals 303 A, B, C and D, inverted, coupled to an output-enable input (active-low tristate control) of each of the output latches 204 A, B, C and D, cause the pixels stored therein to be transmitted to the data output 107 one at a time.

Motion-picture and TV waveforms

FIG. 4 shows a timing diagram of the motion-picture camera and TV signals in an embodiment of the invention.

A shutter-open waveform 401 represents an intensity of infalling light which reaches the TV camera 101. An even-field interval 402 represents time intervals during which light is integrated at an image sensor of the TV camera 101 for even fields; an odd-field interval 403 represents time intervals during which light is integrated at an image sensor of the TV camera 101 for odd fields. A TV input waveform 404 represents the input video signal. A TV output waveform 405 represents the output video signal, comprising a vertical sync part 406 and an active video part 407, as is well known in the art.

The TV input waveform 404 shows that the input video signal is synchronized with the motion-picture camera and comprises gaps between TV fields. The input video signal comprises a sequence of alternating even fields and odd fields: 1 2' 3 4' 5 6' 7 8' 9 10'... (even fields are marked with a prime [']). The TV output waveform 405 shows that the output video signal is a continuous TV signal, but that some fields must be repeated to ensure that the signal is continuous: 1 1 2' 3 4' 5 5 6' 7 8' 9 9 (again, even fields are marked with a prime). Because of the different frame rates of the motion-picture and the TV camera, it is typically necessary to repeat one field out of five.

Even fields and odd fields overlap in time; each even field is at its midpoint when the next odd field starts, and vice versa. Moreover, an equal amount of light is integrated for all fields, regardless of phase-synchronization with the motion-picture camera. For example, interval 7 (i.e., the exposure time for field 7) comprises two partial shutter-open periods 408 A and B, with a total amount of infalling light equal to one entire shutter-open period.

As the field buffer 106 write address is repeatedly incremented, the input video signal is written into a repeatedly incremented location in the memory circuits 203. Any new field information overwrites old field information which is already stored therein. Since the write address is incremented and reset in synchrony with the cinema vertical sync signal, the input video signal is repeatedly overwritten into a fixed memory area in the memory circuits 203.

Similarly, as the field buffer 106 read address is repeatedly incremented, the output video signal is read out from a repeatedly incremented location in the memory circuits 203. Since the read address is both incremented and reset in synchrony with the TV vertical sync signal, the output video signal is repeatedly read out from the same fixed memory area in the memory circuits 203 as the input video signal is written into. Both the read address and the write address are incremented in synchrony, and an active portion of incoming and outgoing fields occupies the same set of memory locations.

The write address cycles through an entire field in 1/60 second and wait for the remainder of 1/48 second, but the read address cycles through an entire field in 1/60 second and does not wait before repeating. As a consequence, the read address periodically overtakes the write address (once every five fields) and the contents of the memory circuits 203 will be reoutput. Thus, one field will be repeated in the output video signal.

Television Synchronization Signals

FIG. 5 shows a timing diagram of horizontal and vertical sync signals for even and odd fields in TV standard composite video.

A horizontal sync signal 501, a vertical sync signal 502 for an even-field A and for an odd-field B are shown. In a composite TV-format signal, the phase of the vertical sync signal 502 with respect to the horizontal sync signal 501 determines if the next field to be output is an even field or an odd field, as is well known in the art. When an odd field is desired, the vertical sync signal 502 B has a high-to-low transition which corresponds to a high-to-low transition of the horizontal sync signal 501; when an even field is desired, the vertical sync signal 502 A has a high-to-low transition which corresponds to a midpoint between successive high-to-low transitions of the horizontal sync signal 501.

Further information about composite TV-format signals may be found in *Television Electronics,* by Milton Kiver and Milton Kaufman, hereby incorporated by reference as if fully set forth herein.

Field Buffer Memory Allocation

FIG. 6 shows a diagram of how the input video signal is stored in the field buffer 106.

A video signal 601 A for an odd field is stored in a set of storage locations in the memory circuits 203, with an address location 602 for each part of the video signal 601 A. The video signal 601 A comprises a plurality of horizontal lines 603, each preceded by a horizontal sync pulse 604. Each horizontal line 603 comprises video information such as luminance and chrominance, as is well known in the art. The video signal 601 A also comprises a vertical sync pulse 605, which may overlie several horizontal lines 603 and thus several horizontal sync pulses 604, and which indicates a time when vertical retrace is to occur.

It is not necessary for the TV camera 101 to begin its vertical retrace exactly as shown in the figure or even at any particular time, so long as the video signal 601 stored in the memory circuits 203 comprises at least the vertical sync pulse 605 and at least a part of the vertical retrace sequence.

Similarly, the video signal 601 B for an even field is stored in a set of storage locations in the memory circuits 203, with an address location 602 for each part of the video signal 601 B. The video signal 601 A for an odd field is stored starting with a base address of zero, but the video signal 601 B for an even field is stored starting with a base address half of a horizontal line 603 offset from zero. (However, the horizontal half line beginning at address location 602 zero is not erased.)

The TV camera 101, under control of the horizontal sync input and the vertical sync input, generates alternating even and odd fields. The WAG 116 generates corresponding addresses for writing into the memory circuits 203 as shown in the figure. The horizontal sync pulses should occur at identical addresses for both even and odd fields, hence the half-line offset at the start of each even field. Otherwise, the horizontal sync of the output video signal will not be in phase.

The output video signal is generated by continuously reading out the contents of the memory circuits 203, starting at address location 602 zero and continuing for one entire field (262.5 horizontal lines 603 in a preferred embodiment). Whether the output video signal is for an even field or an odd field is determined by the position of the vertical sync pulse 605 and the vertical retrace sequence which is read out from the memory circuits 203, in what is otherwise a standard composite TV-format signal.

Thus, when an even field is repeated (because the read address overtakes the write address), the output video signal will indicate two even fields in a row; when an odd field is repeated, the output video signal will indicate two odd fields in a row. However, the horizontal sync signal 501 must be maintained in phase for later broadcast or display of the output video signal. Therefore, WAG 116 is reset to an address location 602 equal to half a horizontal line offset from zero. Note that because the first horizontal half line is not erased when an even field is written into the memory circuits 203, the horizontal sync signal 501 is still available when an odd field is read out from the memory circuits 203 to generate the output video signal.

Motion-Picture Shutter Speed

In an alternative embodiment of the invention, the TV camera 101 frame transmission rate may be reduced so that the TV camera 101 is able to receive more infalling light. This alternative is particularly useful when the motion-picture camera is used in an environment in which there is little ambient light. For example, appropriate circuitry may be added to make the TV camera 101 capture one frame for each two or each three frames captured by the motion-picture camera.

In this alternative embodiment, the remaining circuitry of the invention would operate in like manner, effectively converting a 12 frames/second or 8 frames/second TV image into a standard TV-format image with about 30 frames/second. This makes it possible for the operator to trade reduced image capture rate for an increase in light sensitivity. The resulting increase in blurring for moving objects is not always objectionable.

Freeze-Field and Compare Mode

In a second alternative embodiment of the invention, the field buffer 106 may be expanded in size to two entire fields, and the second field of memory may be used to record a "freeze field" (i.e., a still picture captured by the TV camera 101). In this alternative embodiment, the entire two-field memory circuits 203 may be read out in like manner, thus causing the two fields to be alternately displayed.

Alternative Embodiments

While preferred embodiments are disclosed herein, many variations are possible which remain within the concept and scope of the invention, and these variations would become clear to one of ordinary skill in the art after perusal of the specification, drawings and claims herein.

For example, it would become clear to one of ordinary skill in the art that alternative embodiments of the invention may comprise input and output image formats other than NTSC and PAL formats, and that such alternate embodiments remain within the concept and scope of the invention.

For a second example, it would become clear to one of ordinary skill in the art that the invention may be used as a pure format converter for television image formats which have identical pixel-clock and horizontal synchronization, by simply decoupling the motion-picture camera and directly converting the input video signal to an output video signal.

I claim:

1. A video assist system, comprising
   means for receiving a motion-picture image at a frame rate of a motion-picture camera;
   television camera means for receiving said motion-picture image and for generating an intermittent signal, said intermittent signal having frame in synchrony with a set of frames of said motion-picture image and having image data in each frame disposed at a television rate;
   means for storing a substantially unprocessed form of said intermittent signal, having both control signals and data, in a field buffer; and
   means for reading a continuous television output signal, having both a set of television control signals and a set of television data, from said field buffer.

2. A video assist system as in claim 1, wherein said image data comprises television composite pixel and synchronization information.

3. A video assist system as in claim 1, wherein said means for storing operates intermittently and said means for reading operates continuously.

4. A video assist system as in claim 1, wherein said field buffer comprises
   a plurality of banks of static RAM;
   input port means for writing into said field buffer; and
   output port means for reading from said field buffer.

5. A video assist system as in claim 1, comprising a read address generator and a write address generator for addressing said field buffer.

6. A video assist system as in claim 5, wherein said read address generator operates substantially at a television-format frame rate.

7. A video assist system as in claim 5, wherein said write address generator operates substantially at a motion-picture frame rate.

8. A video assist system as in claim 1, wherein said field buffer comprises one field of memory, and wherein even and odd fields of said intermittent signal are successively stored in said field buffer, whereby when a field is repeated on output, and even field may follow an immediately previous even field and an odd field may follow an immediately previous odd field.

9. A video assist system as in claim 1, wherein said field buffer is composed of substantially a single field of memory, and wherein even and odd fields of said intermittent signal are successively stored in said field buffer, whereby when a field is repeated on output, an even field may follow an immediately previous even field and an odd field may follow an immediately previous odd field.

10. A device as in claim 1, comprising means for offsetting a write address for said field buffer so that even fields and odd field have different starting addresses, whereby a horizontal timing pulse is stored in said field buffer at the same place for even fields and odd fields.

11. A system as in claim 1, wherein said television control signals comprise said control signals from said substantially unprocessed form of said intermittent signal stored in said field buffer.

12. A device for converting a motion-picture image to a television signal, comprising
    a television camera, disposed to receive said motion-picture image, having a horizontal synchronization signal input and a vertical synchronization input, capable of operating at a rate other than a standard television rate;

an A/D converter, coupled to an analog output of said television camera;

a dual-port memory, coupled to a digital output of said A/D converter;

a D/A converter, coupled to an output of said dual-port memory; whereby an output of said D/A converter is suitable for use as a television signal.

13. A device as in claim 12, comprising a write address generator and a read address generator coupled to said dual-port memory;

a first vertical timer operating at a motion-picture frame rate coupled to said write address generator and to said vertical synchronization signal input;

a second vertical timer operating at a television-format frame rate coupled to said read address generator;

a horizontal timer operating at a television-format horizontal line rate coupled to an input of said first and second timers and to said horizontal synchronization signal input.

14. A device as in claim 12, wherein said dual-port memory comprises static memory.

15. A device as in claim 12, wherein said dual-port memory comprises a data input port;

a demultiplexer coupled to said data input port; and a plurality of memory write ports coupled to a plurality of outputs of said demultiplexer.

16. A device as in claim 12, wherein said dual-port memory comprises a plurality of memory read ports;

a multiplexer coupled to said plurality of memory read ports; and a data output port coupled to an output of said multiplexer.

17. A device as in claim 12, comprising means for offsetting a write address for said dual-port memory so that even fields and odd fields have different starting addresses, whereby a horizontal timing pulse is stored in said dual-port memory at the same place for even fields and odd fields.

18. A device as in claim 12, wherein said horizontal synchronization signal input and said vertical synchronization input correspond to an output signal which is substantially in synchrony with a set of frame of said motion-picture image and having image data in each frame disposed at a television rate.

19. Apparatus for the conversion of an optical image available through the optical system of the viewfinder of a motion-picture camera to a standard television signal for viewing and recording at a remote location, comprising a television camera capable of accepting horizontal and vertical synchronization signals from an external source;

an analog to digital converter connected to said television camera for converting the analog video signal at the output of said camera into an equivalent digital output;

a dual port memory connected to said analog to digital converter for simultaneously storing the digital output signal from said analog to digital converter and simultaneously reading out portions of said signal;

a digital to analog converter connected to said dual port memory for converting the output of said dual port memory from digital to analog format, whereby said analog format is suitable for use as a standard video signal for video monitors and recorders;

a first address generator comprising counting, incrementing, resetting and offsetting circuits for generating write addresses for said dual port memory and connected to the address bus of said dual port memory by means of gating circuits;

a second address generator comprising counting, incrementing, resetting and gating circuits for generating read addresses for said dual port memory and connected to the address bus of said dual port memory by means of gating circuits;

a first vertical time-base for generating vertical synchronization signals compatible with a frame rate of a motion-picture camera and connected to a vertical synchronization input for said television camera and to a resetting and a presetting input of said first address generator;

a second vertical time-base for generating a standard television vertical synchronization signal and connected to a resetting input of said second address generator;

a horizontal time-base for generating horizontal standard television synchronization signals connected to a clock input of said first time-base, to a clock input of said second time-base, and to a horizontal synchronization input of said television camera;

a waveform generator for generating a set of master clock and logic control signals for said dual port memory, said first and second time-bases, said first and second address generators, said analog to digital converter, and said digital to analog converter.

20. A method of operating a video assist system, comprising the steps of receiving a motion-picture image at a predetermined frame rate;

receiving said motion-picture image and generating an intermittent signal, said intermittent signal having frame in synchrony with a set of frame of said motion-picture image and having image data in each frame disposed at a television rate;

storing a substantially unprocessed form of said intermittent signal, having both control signals and data, in a field buffer; and reading a continuous television output signal, having both a set of television control signals and a set of television data, from said field buffer.

21. A method as in claim 20, wherein said predetermined frame rate is an integer divisor of a frame rate of a motion-picture camera.

22. A method as claim 20, wherein said image data comprises composite television pixel and synchronization information.

23. A method as in claim 20, wherein said television control signals comprise said control signals from said substantially unprocessed form of said intermittent signal stored in said field buffer.

24. A video assist system, comprising a television camera capable of accepting horizontal and vertical synchronization signals from an external source and capable of integrating a received television image field for a duration substantially equal to a whole frame, said television camera generating a composite television signal;

an image buffer coupled to said composite television signal;

means for storing said composite television signal in said image buffer in a substantially unmodified form;

means for retrieving said composite television signal from said image buffer.

25. A video assist system as in claim 24, wherein said substantially unmodified form includes timing, luminance, and chrominance signals.

26. A video assist system as in claim 24, comprising means for integrating each one of a set of even and odd fields generated by said television camera for a full cycle of a motion-picture camera shutter, whereby there is no need for phase control between said shutter and said television camera.

27. A method of operating a video assist system, comprising the steps of accepting horizontal and vertical synchronization signals from an external source, integrating a received television image field for a duration substantially equal to a whole frame in response thereto, and generating a composite television signal in response thereto;

storing said composite television signal in an image buffer in a substantially unmodified form;

retrieving said composite television signal from said image buffer.

28. A method as in claim 27, wherein said substantially unmodified form includes timing, luminance, and chrominance signals.

29. A method as in claim 27, comprising the step of integrating each one of a set of even and odd fields generated by a television camera for a full cycle of a motion-picture camera shutter, whereby there is no need for phase control between said shutter and said television camera.

30. A video assist system, comprising means for receiving a motion-picture image and for generating an intermediate video image signal in response thereto;

means for storing a substantially unprocessed form of said intermediate video image signal in a field buffer; and means for retrieving a continuous signal from said field buffer at a television standard.

31. A video assist system as in claim 30, wherein said intermediate video signal comprises a television format signal having a set of frames in synchrony with a set of frames of a motion-picture image, and having image data in each one of said set of frames disposed at a television rate.

32. A video assist system as in claim 30, wherein said substantially unprocessed form includes timing, luminance, or chrominance signals.

33. A video assist system as in claim 30, wherein said field buffer comprises means for storing control signals and data.

34. A video assist system as in claim 30, wherein said continuous signal comprises control signals and data which have been retrieved from said field buffer.

35. A method of operating a video assist system, comprising the steps of receiving a motion-picture image and generating an intermediate video image signal in response thereto;

storing a substantially unprocessed form of said intermediate video image signal in a field buffer; and retrieving a continuous signal from said field buffer at a television standard.

36. A method as in claim 35, wherein said intermediate video signal comprises a television format signal having a set of frames in synchrony with a set of frames of a motion-picture image, and having image data in each one of said set of frames disposed at a television rate.

37. A method as in claim 35, wherein said substantially unprocessed form includes timing, luminance, or chrominance signals.

38. A method as in claim 35, wherein said step of storing comprises storing both control signals and data.

39. A method as in claim 35, wherein said continuous signal comprises control signals and data which have been retrieved from said field buffer.

* * * * *